US005748819A

United States Patent [19]
Szentesi et al.

[11] Patent Number: 5,748,819
[45] Date of Patent: May 5, 1998

[54] FIELD INSTALLABLE OPTICAL FIBER CONNECTOR AND AN ASSOCIATED METHOD OF FABRICATION

[75] Inventors: Otto I. Szentesi, Hickory; Rodney A. Throckmorton, Conover, both of N.C.

[73] Assignee: Siecor Corporation, Hickory, N.C.

[21] Appl. No.: 417,312

[22] Filed: Apr. 5, 1995

[51] Int. Cl.[6] ................................................ G02B 6/38
[52] U.S. Cl. ............................ 385/60; 385/70; 385/72; 385/78; 385/96
[58] Field of Search ................................ 385/60, 62, 70, 385/72, 73, 76, 78, 81, 95–99; 65/407, 40, 42, 64, 152, 501

[56] References Cited

U.S. PATENT DOCUMENTS

| 3,579,316 | 5/1971  | Dyott et al.      | 385/95 X |
| 3,928,102 | 12/1975 | Rowe et al.       | 385/50 X |
| 3,960,531 | 6/1976  | Kohanzadeh et al. | 385/96 X |
| 3,989,567 | 11/1976 | Tardy             | 385/99 X |
| 4,049,414 | 9/1977  | Smith             | 385/96 X |
| 4,050,783 | 9/1977  | Tardy             | 385/64   |
| 4,220,394 | 9/1980  | Tardy             | 385/64   |
| 4,266,852 | 5/1981  | Higgins et al.    | 385/96   |
| 4,576,437 | 3/1986  | Ohta et al.       | 385/87   |
| 4,579,418 | 4/1986  | Parchet et al.    | 385/60   |
| 4,598,974 | 7/1986  | Munn et al.       | 385/96   |
| 4,687,288 | 8/1987  | Margolin et al.   | 385/84   |
| 4,834,487 | 5/1989  | Abendschein et al.| 385/78   |
| 4,877,303 | 10/1989 | Caldwell et al.   | 385/55   |
| 4,923,274 | 5/1990  | Dean              | 385/72   |
| 5,040,867 | 8/1991  | de Jong et al.    | 385/60   |
| 5,146,527 | 9/1992  | Mallinson         | 385/98   |
| 5,212,752 | 5/1993  | Stephenson et al. | 385/78   |
| 5,241,613 | 8/1993  | Li et al.         | 385/78   |
| 5,367,594 | 11/1994 | Essert et al.     | 385/70   |
| 5,394,496 | 2/1995  | Caldwell et al.   | 385/70   |
| 5,396,572 | 3/1995  | Bradley et al.    | 385/78   |
| 5,428,703 | 6/1995  | Lee               | 385/78   |

FOREIGN PATENT DOCUMENTS

| 25 16 858 | 10/1976 | Germany.                |
| 2 255 419 | 11/1992 | United Kingdom 385/96   |
| 2 222 467 | 12/1992 | United Kingdom.         |

OTHER PUBLICATIONS

C.E. Hayward, "Connector for Optical Fiber Light Conductor", IBM Technical Disclosure Bulletin, vol. 26, No. 3B, Aug. 1983, pp. 1603.

Y. Kohanzadeh, Hot Splices Of Optical Waveguide Fibers, *Applied Optics*, vol. 15, No. 3, Mar. 1976, pp. 793–795.

*Primary Examiner*—Rodney B. Bovernick
*Assistant Examiner*—Hemang Sanghavi
*Attorney, Agent, or Firm*—Wesley T. Noah

[57] ABSTRACT

An optical fiber connector includes a longitudinally extending ferrule having fusion access means defined therein such that an optical fiber stub and a second optical fiber can be fused in the field during installation of the optical fiber connector. In one embodiment, the fusion access means includes a fusion access slot which extends transversely across the ferrule from a first side of the ferrule to a bottom portion of the fusion access slot such that a bore defined longitudinally through the ferrule opens into the fusion access slot. In this embodiment, the radial distance between the bottom portion of the fusion access slot and the second side of the ferrule, opposite the first side, is greater than a predetermined radial distance such that the fusion access slot does not significantly weaken the ferrule so that the ferrule remains structurally intact during use. In another embodiment, the fusion access means includes a fusion access port defined transversely through the ferrule such that the fusion access port is in communication with the longitudinal bore and thereby defines an internal splice cavity in which the end portions of the optical fiber stub and the second optical fiber can also be fused to form an integral optical fiber. By carefully defining the fusion access means within the ferrule, however, the structural integrity of the ferrule can be maintained such that the resulting optical fiber connector is durable and strong.

42 Claims, 4 Drawing Sheets

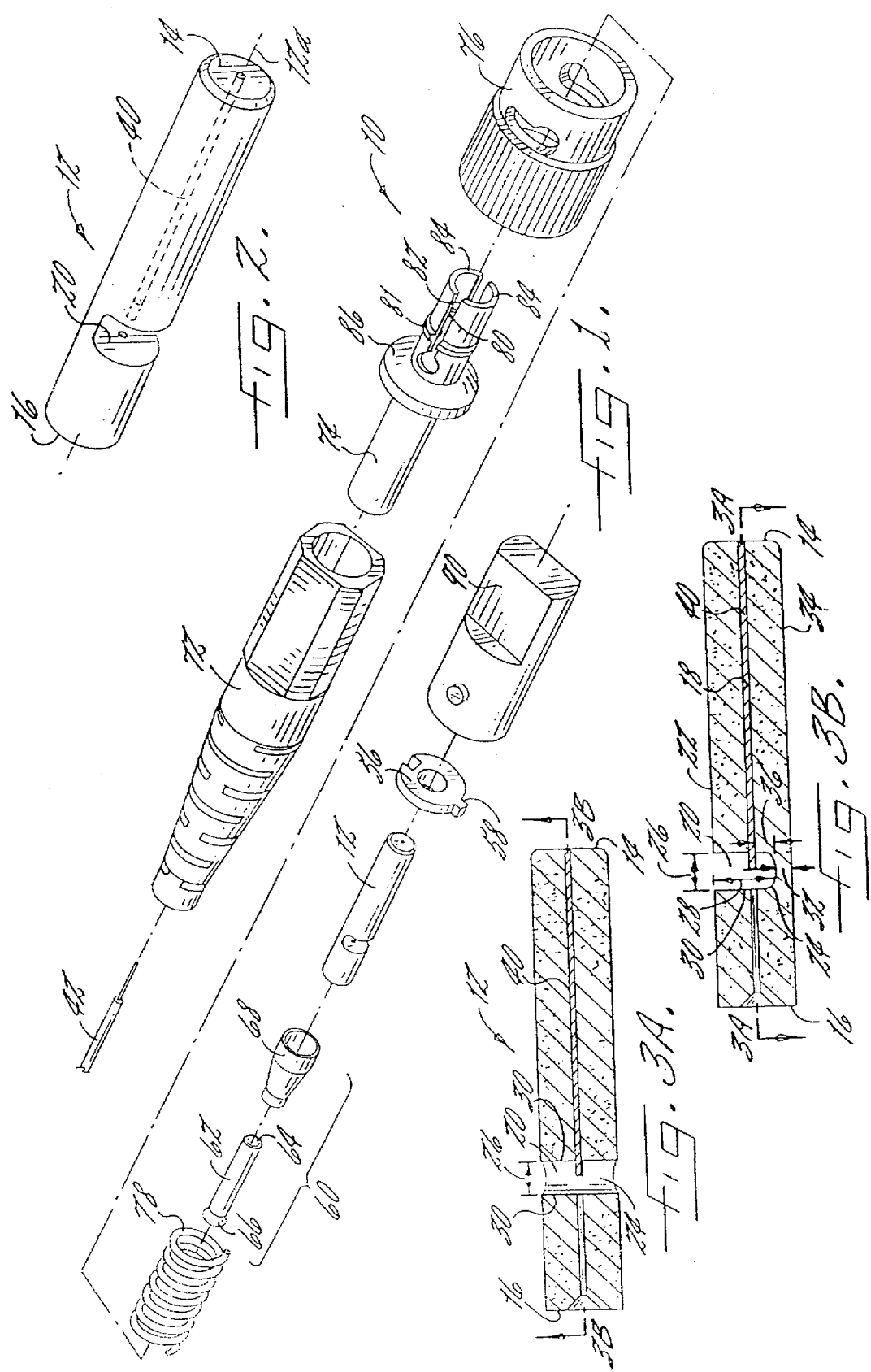

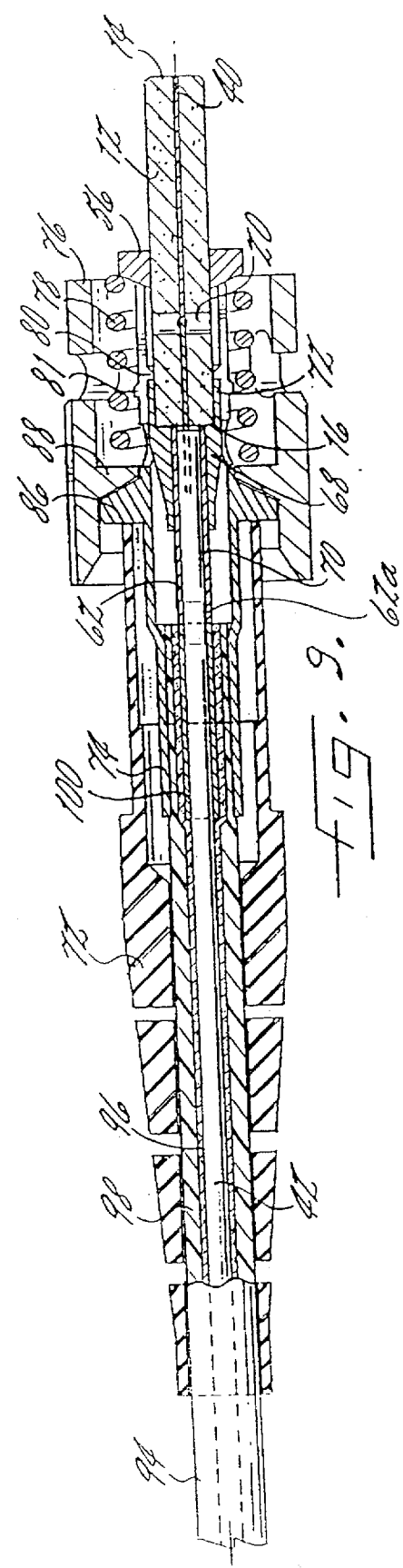

FIELD INSTALLABLE OPTICAL FIBER CONNECTOR AND AN ASSOCIATED METHOD OF FABRICATION

FIELD OF THE INVENTION

The present invention relates generally to optical fiber connectors and associated methods of fabrication and, more particularly, to optical fiber connectors adapted for field installation and their associated methods of fabrication.

BACKGROUND OF THE INVENTION

Optical fibers are widely used in a variety of applications, including the telecommunications industry in which optical fibers are employed in a number of telephony and data transmission applications. Due, at least in part, to the extremely wide bandwidth and the low noise operation provided by optical fibers, the use of optical fibers and the variety of applications in which optical fibers are used are continuing to increase. For example, optical fibers no longer serve as merely a medium for long distance signal transmission, but are being increasingly routed directly to the home or, in some instances, directly to a desk or other work location.

With the ever increasing and varied use of optical fibers, it is apparent that efficient methods of coupling optical fibers, such as to other optical fibers, to a patch panel in a telephone central office or in an office building or to various remote terminals or pedestals, is required. However, in order to efficiently couple the signals transmitted by the respective optical fibers, an optical fiber connector must not significantly attenuate or alter the transmitted signals. In addition, the optical fiber connector must be relatively rugged and adapted to be connected and disconnected a number of times in order to accommodate changes in the optical fiber transmission path.

In order to provide the desired signal transmission characteristics, a number of optical fiber connectors have been developed which are mounted to the end portion of an optical fiber during a factory assembly process. By mounting the optical fiber connector to the optical fiber and/or optical fiber cable (hereinafter optical fiber) during an assembly process at the factory, the assembly of the optical fiber connector can be standardized such that inconsistent assembly and other problems associated with the field installation of the connector are avoided.

However, the factory installation of fiber optic connectors is not altogether satisfactory for every application. In particular, the factory installation of fiber optic connectors does not customize the installation process to account for the myriad of design variations experienced in the field. For example, by installing fiber optic connectors to the end portion of an optical fiber at the factory, the length of the connectorized optical fiber is fixed, thus requiring excess length and coiling to insure sufficient length for all applications. In addition, in many instances, it is desirable to cut a length of optical fiber into a plurality of shorter lengths of optical fiber, each of which must be individually connected, such as by an optical fiber connector, to another optical fiber or to a patch panel or other type of terminal. However, the respective lengths of the shorter optical fibers cannot generally be determined until the optical fibers are installed in the field. Thus, in this instance, the requisite optical fiber connectors cannot be mounted to the fibers at the factory prior to installation of the optical fiber. Still further, it is desirable, in many instances, to package and ship optical fiber prior to the installation of the fiber optic connectors since the fiber optic connectors generally have a greater diameter than the respective optical fiber, and may unnecessarily complicate the packaging and shipping of the optical fiber.

Consequently, several optical fiber connectors have been developed which can be mounted to the end portion of an optical fiber in the field once the particular application of the optical fiber has been determined. For example, U.S. Pat. No. 5,040,867 which issued Aug. 20, 1991 to Michael de Jong et al. and which is assigned to Siecor Corporation, the assignee of the present invention, discloses an optical fiber connector which is adapted for installation in the field. One embodiment of the optical fiber connector of U.S. Pat. No. 5,040,867 is the Camlite® connector which is also manufactured and distributed by Siecor Corporation.

The Camlite® connector includes a lengthwise extending ferrule defining a longitudinal bore therethrough attached to a V-groove splice with a camming means for securing a fiber in the splice. A short length of optical fiber, typically termed an optical fiber stub, is disposed in the bore of the ferrule and extends into the V-groove splice. In the field, the end portion of an optical fiber, typically termed the field fiber, to which the optical fiber connector is to be connected can be inserted in the V-groove splice from the end opposite the ferrule. Due to the precise alignment of the longitudinally extending V-groove within the Camlite® connector, the end portion of the field fiber is aligned with the optical fiber stub and thereafter held in place by activating the camming means.

The Camlite® connector can also include a crimp tube mounted to the end of the V-groove opposite the ferrule such that the field fiber extends therethrough. By compressing the crimp tube radially inward so as to contact the buffer of the field fiber cable, the field fiber is fixed in position relative to the ferrule and the aligned optical fiber stub. The ferrule of the Camlite® connector can, in turn, be disposed within any of the standard connector housings. For example, the ferrule of the Camlite® connector is compatible with and can be mounted within an FC, ST or SC connector housing. The resulting Camlite® connector can then be connected, such as with a coupling sleeve, to the end portion of another optical fiber which also has an appropriate connector mounted to an end portion thereof. Alternatively, the resulting Camlite® connector can be connected to a patch panel, remote terminal or pedestal.

While the Camlite® connector is a great advance in the art, the Camlite® connector mechanically splices the field fiber to the optical fiber stub. Even though mechanical splices generally provide acceptable signal transmission characteristics, a mechanical splice can reflect a portion of the transmitted signal so as to produce a corresponding return loss. This reflectance is due, at least in part, to differences between the respective indices of refraction of the field fiber, the optical fiber stub and the index matching gel which fills the bore of ferrule between the optical fiber stub and the end portion of the field fiber. In particular, while the respective indices of refraction of the field fiber, the optical fiber stub and the index matching gel can be matched at a predetermined temperature, the respective indices of refraction vary in different manners as the temperature fluctuates such that a portion of the transmitted signal can be reflected by the mechanical splice to thereby create a return loss.

Consequently, optical fiber connectors in which an optical fiber stub is fused to the field fiber have been developed. For example, U.S. Pat. No. 4,598,974 which issued Jul. 8, 1986 to Robert D. Munn et al. and is assigned to International Business Machines Corporation discloses an optical fiber connector which includes an optical fiber stub fused to a field fiber. In particular, the optical fiber connector of U.S. Pat. No. 4,598,974 includes a ferrule defining a bore in which an optical fiber stub is disposed. This optical fiber connector is also adapted to receive an end portion of the field fiber within the internal bore such that the end portion of the field fiber is adjacent to and aligned with the optical fiber stub within an internal splice chamber defined within the ferrule.

The optical fiber connector of U.S. Pat. No. 4,598,974 further includes a pair of diametrically opposed electrodes. The electrodes are permanently mounted in the ferrule during its factory fabrication and extend into the splice chamber so as to form an arc gap therebetween. Therefore, by creating an arc between the electrodes, the end portion of the field fiber can be fused to the fiber optic stub. However, as will be apparent to those skilled in the art, the permanently mounted pair of electrodes can increase both the material cost and complexity of the optical fiber connector.

Another optical fiber connector which welds an optical fiber stub to the end portion of a field fiber is disclosed in U.S. Pat. No. 4,220,394 which issued Sep. 2, 1980 to Andre Tardy and is assigned to Société Anonyme dite: Campagnie Generale diElectricite. As described in U.S. Pat. No. 4,220,394, the optical fiber stub is disposed within a connection part and is aligned by a plurality of guide rods and holding rods. An end portion of the field fiber can likewise be held by a grouping element which can, in turn, be mounted in an aligned relationship, by means of an intermediate part, to the connection part. Thereafter, the optical fiber stub and the end portion of the field fiber can be welded with an oxyhydrogen micro-blowpipe. The optical fiber connector of U.S. Pat. No. 4,220,394 requires, however, several different parts to hold and align the optical fiber stub and the field fiber, each of which must be assembled so as to properly align and weld the optical fiber stub to the field fiber.

SUMMARY OF THE INVENTION

It is therefore an object of the present invention to provide an improved optical fiber connector.

It is another object of the present invention to provide an improved optical fiber connector adapted for field installation.

It is a further object of the present invention to provide an optical fiber connector having increased strength and durability.

It is yet another object of the present invention to provide an improved method for fabricating an optical fiber connector.

These and other objects are provided, according to the present invention, by an optical fiber connector and an associated method of fabricating an optical fiber connector which includes an integral ferrule and fusion access means such that an optical fiber stub and a field fiber can be fused within the optical fiber connector in the field. In one embodiment, the fusion access means includes a fusion access slot while, in another embodiment, the fusion access means includes at least one fusion access port.

In either embodiment, the optical fiber connector includes a longitudinally extending ferrule having first and second opposed ends and a bore defined longitudinally therethrough. According to the first embodiment, a fusion access slot is formed in the ferrule. During this formation process, a fluid stream is preferably directed through the bore of the ferrule from one or both ends to clear debris from the bore. The fusion access slot extends transversely across the ferrule from a first side of the ferrule to a bottom portion of the fusion access slot.

The fusion access slot is sufficiently deep that the longitudinal bore of the ferrule opens into the fusion access slot. However, the radial distance between the bottom portion of the fusion access slot and the second side of the ferrule, opposite the first side, is greater than a predetermined radial distance such that the ferrule remains structurally intact during use. Thus, the optical fiber connector can be connected and disconnected a number of times and various loads can be placed on the optical fiber connector without fracturing or otherwise damaging the ferrule.

The optical fiber connector also preferably includes an optical fiber stub, disposed within the bore of the ferrule, which extends from a first end adjacent the first end of the ferrule to a second end disposed within the fusion access slot. The first end of the optical fiber stub is preferably polished such that the signal transmission characteristics of the optical fiber connector are enhanced. In addition, the second end of the optical fiber stub preferably has a cleave angle of less than about 1°. The ferrule is also adapted for receiving a second optical fiber, such as a field fiber, which extends through the bore from the second end of the ferrule to the fusion access slot. The ferrule maintains the second optical fiber and the optical fiber stub in general alignment so that the second optical fiber and the optical fiber stub can be fused within the fusion access slot during a field installation procedure.

According to this embodiment, the fusion access slot includes first and second opposed sidewalls extending from a respective transversely extending edge of the bottom portion of the fusion access slot to the first side of the ferrule. In one embodiment, each respective edge of the bottom portion of the fusion access slot is curved to further increase the structural integrity of the ferrule. More particularly, the curved edges of the bottom portion of the fusion access slot preferably have a predetermined radius of curvature which is greater than a predetermined minimum radius of curvature.

The radial distance between the longitudinal axis defined by the bore of the ferrule and the bottom portion of the fusion access slot is also preferably greater than a predetermined minimum radial distance such that the second optical fiber and the optical fiber stub can be properly fused therein. The fusion access slot also has a predetermined width. The predetermined width of the fusion access slot is preferably less than a predetermined maximum width to further provide that the ferrule remains structurally intact during use. However, the predetermined width of the fusion access slot is also preferably greater than a predetermined minimum width such that the second optical fiber and the optical fiber stub can be properly fused therein.

In another embodiment, the fusion access means of the ferrule includes a cylindrical fusion port extending transversely through the ferrule. The fusion access port is in communication with the longitudinal bore to thereby define a splice cavity within the ferrule. The fusion access port also has a predetermined diameter which, in preferred embodiments, is less than a predetermined maximum diameter such that the ferrule remains structurally intact during use.

In this embodiment, the optical fiber stub is preferably disposed within the bore of the ferrule so as to extend from a first end adjacent the first end of the ferrule to a second end disposed within the splice cavity. In addition, the ferrule is also adapted for receiving the second optical fiber, such as a field fiber, which extends through the bore from the second end of the ferrule and into the splice cavity such that the second optical fiber and the optical fiber stub can be fused therein. Thus, in addition to being less than a predetermined diameter, the predetermined diameter of the fusion access port is preferably greater than a predetermined minimum diameter such that the second optical fiber and the optical fiber stub can be properly fused within the splice cavity.

The ferrule of this embodiment can also include at least one viewing port extending transversely through the ferrule. The viewing port is in communication with the splice cavity such that the fusion process can be monitored. In one embodiment, the fusion access port and the viewing port define a fusion access port axis and a viewing port axis, respectively. In this embodiment, the fusion access port axis and the viewing port axis define a predetermined angle therebetween, such as 90°.

In either embodiment, the optical fiber connector can also include an annular alignment key mounted to the ferrule such that the ferrule extends therethrough. The alignment key provides a position indication such that the fusion access means can be oriented in a predetermined angular relationship.

The optical fiber connector can also include a crimp tube assembly mounted to the second end of the ferrule. The crimp tube assembly defines a lengthwise extending aperture which is aligned with the bore defined by the ferrule. Thus, the second optical fiber preferably extends through both the aperture defined by the crimp tube assembly and the bore defined by the ferrule. In one embodiment, the crimp tube assembly includes a crimp tube adapted to receive the second optical fiber and an adapter housing adapted to couple the crimp tube to the second end of the ferrule. In particular, the adaptor housing of this embodiment preferably defines an internal cavity having first and second cavity portions having first and second internal diameters, respectively. The first internal diameter of the adapter housing is preferably sized to receive the second end of the ferrule, while the second internal diameter of the second cavity portion is sized to receive the crimp tube.

The optical fiber connector can also include a lengthwise extending tubular crimp body mounted over the crimp tube assembly to the second end of the ferrule. The tubular crimp body also defines a longitudinal bore through which the second optical fiber extends. In addition, the tubular crimp body can include a first ring extending radially inward into the longitudinal bore. Once assembled, the first ring of the tubular crimp body is longitudinally inward of the crimp tube assembly and is sized smaller than the crimp tube assembly such that the tubular crimp body is securely mounted to the ferrule. In order to facilitate assembly, the tubular crimp body can also define a lateral slot which extends from a first end of the tubular crimp body longitudinally inward beyond the first ring to thereby divide a portion of the tubular crimp body into first and second crimp body segments. The first and second crimp body segments are adapted to resiliently deflect outwardly such that the tubular crimp body can be mounted over the crimp tube assembly.

The optical fiber connector of one embodiment of the present invention can also be mounted to the end portion of a single fiber cable which includes a buffered optical fiber and one or more lengthwise extending strength members surrounded by a protective jacket. According to the present invention, an end portion of the jacket is removed to expose the buffered optical fiber and the buffer coating is then removed from an end portion of the exposed optical fiber.

The end portion of the exposed optical fiber can be extended through the bore of a tube which is inserted within the single fiber cable between the protective jacket and the buffered optical fiber. Thereafter, the end portion of the exposed optical fiber is inserted into the second end of the ferrule. In one embodiment, the end portion of the exposed field fiber is then fused to an optical fiber stub and the components of a connector housing are assembled. The crimp body can then be radially compressed about the portion of the single fiber cable in which the tube has been inserted. Thus, the jacket and the strength member of the single fiber cable can be securely held in a fixed position relative to the optical fiber connector.

Therefore, according to the present invention, a durable optical fiber connector which includes a monolithic ferrule and fusion access means, such as a fusion access slot or a fusion access port, is provided such that an optical fiber stub and a field fiber can be fused in the field. In particular, the fusion access means of the ferrule is formed without significantly weakening the ferrule such that the ferrule will remain structurally intact without fracturing or being otherwise damaged during use. Thus, the optical fiber connector can be connected and disconnected numerous times without damaging the connector. In addition, the optical fiber connector of the present invention can readily be installed by technicians in the field by fusing the optical stub fiber to the field fiber while maintaining the excellent signal transmission properties of the optical fiber.

BRIEF DESCRIPTION OF THE DRAWINGS

FIG. 1 is an exploded perspective view of one embodiment of an optical fiber connector of the present invention illustrating the various components of the housing as well as a ferrule having a fusion access slot defined therein.

FIG. 2 is a perspective view of a portion of one embodiment of an optical fiber connector according to the present invention illustrating a ferrule having a fusion access slot defined therein.

FIG. 3A is a longitudinal cross-sectional view of the embodiment of the ferrule of the present invention shown in FIG. 2 and taken along line 3A—3A of FIG. 3B which illustrates the width of the transversely extending fusion access slot.

FIG. 3B is a longitudinal cross-sectional view of the embodiment of the ferrule of the present invention shown in FIG. 2 and taken along line 3B—3B of FIG. 3A which illustrates the depth and rounded edges of the bottom portion of the fusion access slot.

FIG. 9 is a longitudinal cross-sectional view of an embodiment of the optical fiber connector of the present invention illustrating its connection to an end portion of a single fiber cable.

DETAILED DESCRIPTION OF THE PREFERRED EMBODIMENTS

Figure 4:
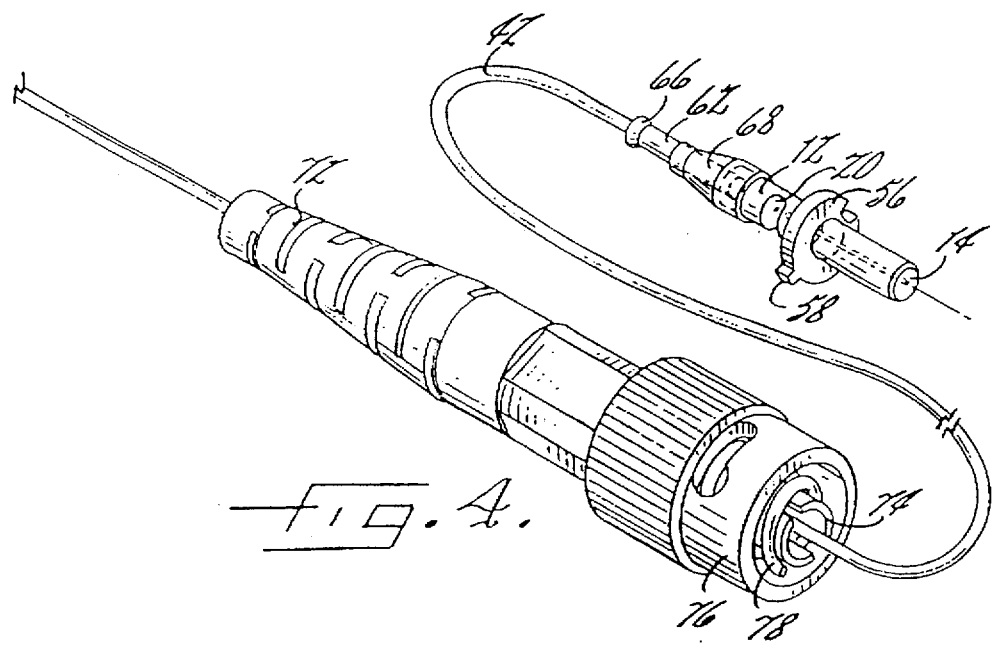
FIG. 4 is a perspective view of an optical fiber connector of one embodiment of the present invention which has been partially assembled in preparation for the fusing of the optical fiber stub to a field fiber.

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Referring now to FIG. 1, an optical fiber connector 10 according to one embodiment of the present invention is illustrated in an exploded perspective view. The optical fiber connector includes a longitudinally extending ferrule 12 having first and second opposed ends 14 and 16, respectively, and a bore 18 defined longitudinally therethrough. The ferrule is typically comprised of a ceramic material, such as zirconia, but can also be comprised of a glass, plastic or composite material without departing from the spirit and scope of the present invention. As shown in more detail in FIG. 2, the ferrule is generally cylindrical and the bore defined therethrough is generally defined along the longitudinal axis 12a of the ferrule.

The ferrule 12 includes fusion access means such that a pair of optical fibers aligned by the ferrule can be fused as explained hereinafter. In the embodiment illustrated in FIGS. 2, 3A and 3B, the fusion access means includes a fusion access slot 20 defined by the ferrule. In particular, the fusion access slot extends transversely across the ferrule from a first side 22 of the ferrule to a bottom portion 24 of the fusion access slot. Thus, the fusion access slot has a predetermined width 26 and a predetermined depth 28, as best shown in FIGS. 3A and 3B, respectively.

As illustrated, the fusion access slot 20 is sufficiently deep that the bore 18 opens through each of the first and second opposed sidewalls 30 of the fusion access slot. According to the present invention, however, the predetermined depth 28 of the fusion access slot is such that a significant amount of the material which forms the ferrule connects the two portions of the ferrule which are separated by the fusion access slot. In particular, the radial distance 32 between the bottom portion 24 of the fusion access slot and a second side 34 of the ferrule, opposite the first side 22, is greater than a predetermined radial distance such that the fusion access slot does not significantly weaken the ferrule so that the ferrule remains structurally intact during use. Consequently, the ferrule will remain integral and will not break or otherwise fracture during normal use, including during repeated connections and disconnections.

As explained hereinafter, a sufficient distance 36 must also be maintained between the longitudinal axis 12a defined by the bore 18 and the bottom surface 24 of the fusion access slot 20, such that the optical fibers can be fused within the fusion access slot. For example, for a ferrule 12 having a diameter of 2.5 mm, the depth 28 of the fusion access slot is preferably 1.5 mm to 2.0 mm and, more preferably, about 1.75 mm. Correspondingly, the radial distance 32 between the bottom portion of the fusion access slot of this embodiment and the second side 34 of the ferrule is preferably between 1.0 mm and 0.5 mm and, more preferably is about 0.75 mm.

In addition, the predetermined width 26 of the fusion access slot 20 is also preferably less than a predetermined maximum width to further improve the structural integrity of the ferrule. However, the predetermined width of the fusion access slot must also be sufficiently large that the optical fibers can be fused within the fusion access slot as explained hereinafter. Thus, for a ferrule 12 having a length of about 15.5 mm, the fusion access slot preferably has a width of between about 1 mm and about 2 mm and, more particularly, has a width of about 1.5 mm.

The transversely extending bottom surface 24 of the fusion access slot 20 is preferably parallel to a line tangent to the surface of the first side 22 of the ferrule 12 from which the fusion access slot extends. Thus, the depth 28 of the fusion access slot as well as the radial distance 32 between the bottom portion of the fusion access slot and the second side 34 of the ferrule are preferably measured between the deepest portion of the bottom surface of the fusion access slot and lines tangent to the first and second sides of the ferrule, respectively.

As best shown in FIGS. 3A and 3B, the optical fiber connector 10 also preferably includes an optical fiber stub 40 disposed within the bore 18 of the ferrule 12 and extending from a first end adjacent a first end 14 of the ferrule to a second end disposed within the fusion access slot 20. The second end of optical fiber stub 40 is preferably cleaved with a good finish, the cleave angle being preferably less than one degree. Typically, the optical fiber stub is secured within the bore of the ferrule, for example with an epoxy. For example, for a ferrule having a length of 15.5 mm, an optical fiber stub having a length of 11 mm can be secured within the bore of the ferrule. As also illustrated, the second end of the optical fiber stub preferably extends about halfway across the fusion access slot. Thus, for a fusion access slot having a width 26 of 1.5 mm, the optical fiber stubs preferably extends approximately 0.75 mm across the fusion access slot.

The ferrule 12 is also adapted to receive a second optical fiber 42, such as a field fiber, which extends through the bore 18 of the ferrule from the second end 16 of the ferrule to the fusion access slot 20. The second optical fiber can have various coating diameters, including 250 µm and 900 µm buffered optical fibers, without departing from the spirit and scope of the present invention. The glass fiber is typically 125 µm, and the bore is sized accordingly. As illustrated, the second optical fiber also preferably extends about halfway across the fusion access slot. Due to the precise alignment of the bore defined through the ferrule, the second optical fiber and the optical fiber stub 40 are maintained in general alignment so that the second optical fiber and the optical fiber stub can be fused within the fusion access slot. In particular, the ferrule of the present embodiment preferably maintains the alignment of the second optical fiber and the optical fiber stub such that single mode optical fibers can be reliably fused without introducing significant reflections or modal interference.

As illustrated, the fusion access slot 20 defined by the ferrule 12 also includes first and second opposed sidewalls 30 extending radially from a respective transversely extending edge of the bottom portion 24 of the fusion access slot to the first side 22 of the ferrule. In one embodiment, each respective edge of the bottom portion of the fusion access slot is curved to further strengthen the ferrule. In particular, each curved edge of the bottom portion of the fusion access slot preferably has a predetermined radius of curvature. The predetermined radius of curvature of each curved edge is advantageously greater than a predetermined minimum radius of curvature to further increase the structural integrity of ferrule. For example, for a ferrule having a fusion access slot having a width of 1.5 mm and a depth of 1.75 mm, the radius of curvature of each curved edge of the bottom portion of the fusion access slot is preferably greater than about 0.2 mm and, more particularly, is about 0.25 mm.

Figure 8:
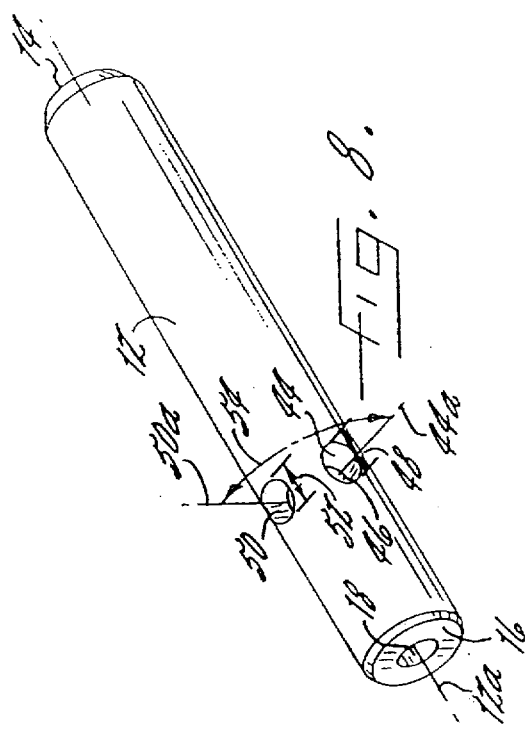
FIG. 8 is a perspective view of a portion of one embodiment of an optical fiber connector according to the present invention illustrating a ferrule having a fusion access port and a viewing port defined transversely therethrough.

According to another embodiment of the ferrule 12 of the present invention illustrated in FIG. 8, the fusion access means of the ferrule includes at least one cylindrical fusion access port 44 extending transversely through the ferrule. As illustrated, the fusion access port is in communication with the longitudinal bore 18 of the ferrule to thereby define a splice cavity 46. As shown, the fusion access port preferably extends diametrically through the ferrule. In addition, the fusion access port preferably has a predetermined diameter 48 and, more preferably, has a predetermined diameter which is less than a predetermined maximum diameter such that the fusion access port does not significantly structurally weaken the ferrule so that the ferrule will remain structurally intact during use. However, the predetermined diameter of the fusion access port must also preferably be greater than a predetermined minimum diameter such that a second optical fiber 42 and an optical fiber stub 40 can be properly fused within the splice cavity as described hereinbelow.

As described above, the ferrule 12 of this embodiment also includes an optical fiber stub 40 disposed within the bore 18 of the ferrule and extending from a first end adjacent to the first end 14 of the ferrule to a second end disposed within the splice cavity 46 defined within the ferrule. The ferrule of this embodiment is also adapted for receiving a second optical fiber 42 through the bore of the ferrule from the second end 16 of the ferrule to the splice cavity such that the ferrule maintains the second optical fiber and the optical fiber stub in general alignment.

As also illustrated in FIG. 8, the ferrule 12 of this embodiment can also define at least one viewing port 50 extending transversely through the ferrule. The viewing port is also in communication with the splice cavity 46 such that the fusion of the second optical fiber 42 and the optical fiber stub 40 can be monitored as described hereinbelow. In addition, as described above in conjunction with the fusion access port 44, the viewing port preferably has a predetermined diameter 52 and, more preferably, has a predetermined diameter that is less than a predetermined maximum diameter such that the viewing port does not significantly structurally weaken the ferrule so that the ferrule remains structurally intact during use. The predetermined diameter of the viewing port can be less than the predetermined minimum diameter of the fusion access port, however, as the viewing port need not be large enough to permit fusion of the optical fiber stub and the second optical fiber therethrough.

In addition, the fusion access port 44 and the viewing port 50 define a fusion access port axis 44a and a viewing port axis 50a, respectively. As illustrated in FIG. 8, the fusion access port axis and the viewing port axis define a predetermined angle 54 therebetween. For example, in the illustrated embodiment, the predetermined angle defined between the fusion access port axis and the viewing port axis is 90 degrees. By orienting the fusion access port and the viewing port substantially orthagonally, the strength of the ferrule can be further enhanced.

According to the present invention, a method of fabricating an optical fiber connector 10 is also provided. According to this method, the longitudinally extending ferrule 12 having first and second opposed ends 14 and 16, respectively, and a bore 18 defined longitudinally therethrough is formed. In order to fabricate the ferrule of the first embodiment described above, a fusion access slot 20 is then formed, such as by grinding the ferrule. Alternatively, a fusion access port 44 and, in some embodiments, a viewing port 50, can be formed, such as by drilling, through the ferrule. During the forming of either the fusion access slot or the fusion access port, a fluid stream, such as a stream of compressed air, is preferably directed through the bore of the ferrule from one or both ends such that the bore remains clear and unobstructed.

Once the fusion access means has been formed, the optical fiber stub 40 can be disposed within the bore 18 of the ferrule 12 so as to extend from a first end adjacent the first end 14 of the ferrule to a second end positioned within the fusion access slot 20 or the splice cavity 46. The second end of optical fiber stub is preferably cleaved with a good finish, the cleave angle being preferably less than one degree. The optical fiber stub is preferably secured within the bore, such as with an epoxy, and the first end of the optical fiber stub is preferably polished to facilitate optical transmission therethrough.

Typically, an annular alignment key 56 is provided to fix the ferrule 12 against rotation after the assembled optical fiber connector 10 has been installed in the field, such as to a coupling sleeve or other type of connector. As known to those skilled in the art, rotation of the optical fiber connector could damage the end face of the ferrule. The annular alignment key also can provide an angular position indication for use in aligning the eccentricity of the fiber-ferrule assembly to maximize optical power transmission for a mated pair of optical fiber connectors. Such angular position indication can be established by optical detection during rotation.

In addition, the annular alignment key 56 may be used to establish the angular position of the fusion access means relative to the ferrule 12. Thus, the fusion access means can be properly positioned in the fusion fixture during the fusion process as described hereinafter in conjunction with FIG. 5.

The annular alignment key 56 is typically comprised of a plastic or metallic material and has a position indicator 58, such as a tab extending radially outwardly, which is mounted in a predetermined angular position relative to the ferrule 12 as shown in FIG. 4. For example, the alignment key can be press-fit on the ferrule or can be secured to the ferrule, such as with an epoxy. Thereafter, the fusion access means, such as a fusion access slot 20 or the fusion access port 44 can be formed in a predetermined angular relationship to the position indicator of the alignment key.

Figure 7:
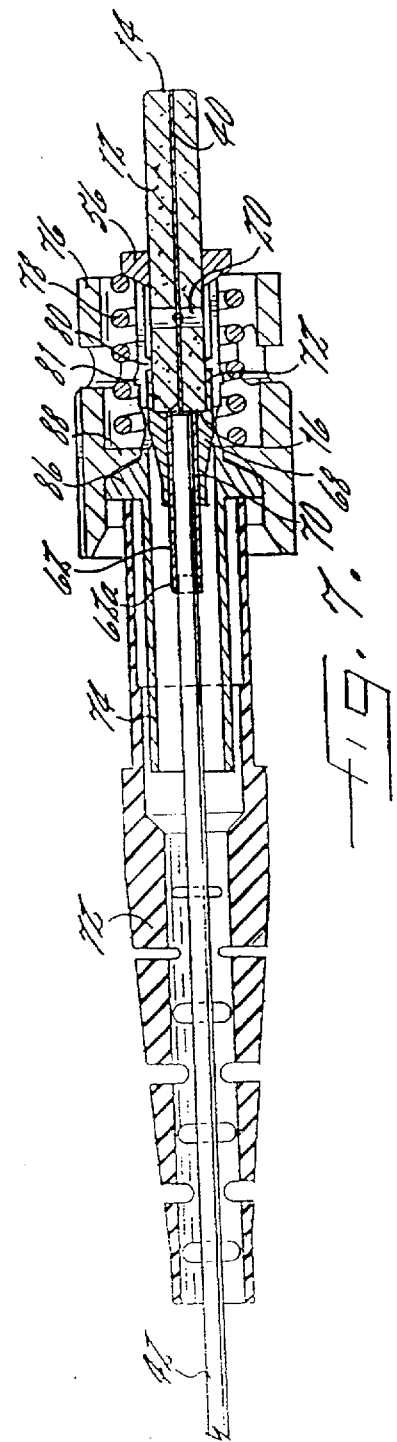
FIG. 7 is a longitudinal cross-sectional view of the embodiment of the optical fiber connector of the present invention illustrated in FIG. 6 and taken along line 7—7.

As shown in FIGS. 1, 4 and 7, a crimp tube assembly 60 can also be mounted to the second end 16 of the ferrule 12 for securing the second optical fiber 42 to the ferrule in a manner which will protect the fused joint from subsequent axial forces (e.g., tension and torsion) to which the second optical fiber is subjected. As illustrated, the crimp tube assembly is mounted to the second end of the ferrule such that the lengthwise extending aperture defined by the crimp tube assembly is aligned with the bore 18 of the ferrule. Thus, the second optical fiber can extend through both the aperture defined by the crimp tube assembly and the bore defined by the ferrule.

More particularly, the crimp tube assembly 60 generally includes a crimp tube 62 having first and second opposed ends 64 and 66, respectively. The crimp tube assembly also generally includes an adapter housing 68 defining an internal cavity having first and second cavity portions 70 and 72, respectively. The first and second cavity portions preferably have first and second internal diameters, respectively. The first internal diameter of the first cavity portion of the adapter housing is preferably sized to receive the second end 16 of the ferrule 12. In contrast, the second internal diameter of the second cavity portion is preferably sized to receive the first end of the crimp tube.

Although the adapter housing 68 and the crimp tube 62 are shown in FIG. 1 as separate components, the adapter housing and the crimp tube can be integrally formed without departing from the spirit and scope of the present invention. In addition, the crimp tube assembly 60 can be comprised of either a plastic or a metallic material and can be mounted to the second end 16 of the ferrule 12 in a press fit relationship or can be secured thereto, such as with an epoxy.

Once a crimp tube assembly 60 has been mounted to the second end 16 of the ferrule 12, the buffer of an end portion of the second optical fiber 42 is preferably removed so as to expose the glass optical fiber itself as shown in FIG. 1. The end portion of the second optical fiber can then be cleaved and inserted through the aperture defined by the crimp tube assembly and the bore 18 defined by the ferrule such that the end portion of the second optical fiber is disposed within the fusion access slot 20 or within the splice cavity 46 in a generally aligned relationship with the optical fiber stub 40. The end portions of the optical fiber stub and the second optical fiber can then be fused. After fusion, an end portion 62a of the crimp tube 62 is crimped to secure the second optical fiber as shown in cross-section in FIG. 7.

Figure 5:
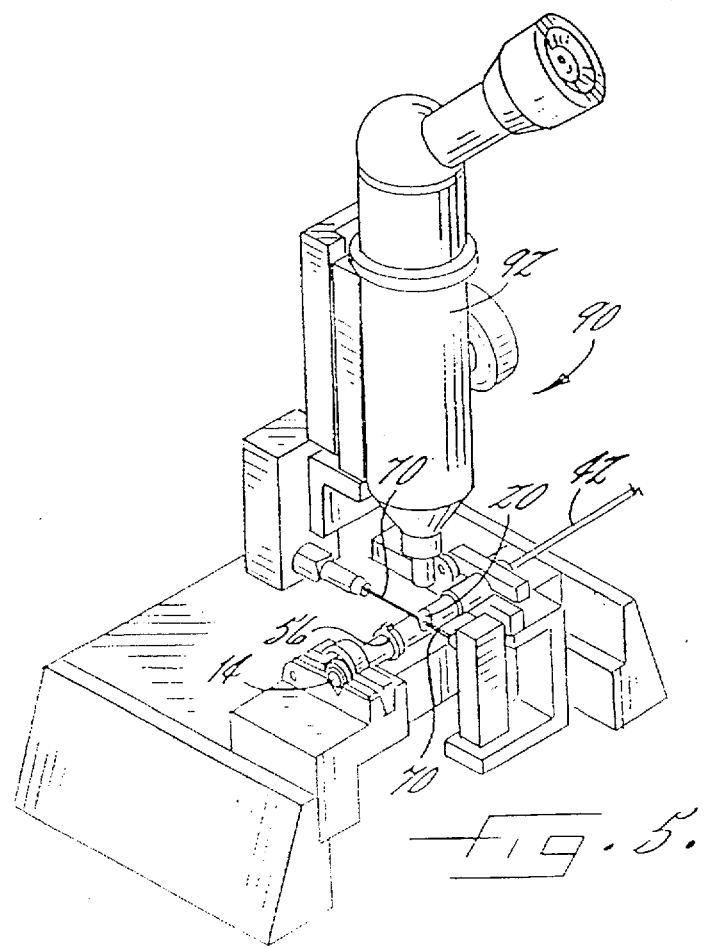
FIG. 5 is a perspective view of one embodiment of the optical fiber connector of the present invention illustrating the fusing of the optical fiber stub and the field fiber.

In particular, as illustrated in FIG. 5, the partially-assembled optical fiber connector can be disposed between a pair of electrodes 70 such that the electrodes are aligned with the fusion access slot 20 or the fusion access port 44. For example, the ferrule can be controllably positioned by a fusion fixture 90 such that the electrodes are appropriately aligned with the fusion access slot or the fusion access port. The fusion fixture can also include fiber viewing means, such as a microscope or other type of magnifying viewing instrument 92 which allows a technician to monitor the separation and cleave quality respective end faces of the optical fiber stub 40 and the second optical fiber 42 such that the separation can be adjusted, if necessary, prior to the fusion process. It is generally unnecessary to adjust the relative positions of the optical fiber stub and the second optical fiber, however, since the bore 18 of the ferrule 12 is typically precisely aligned along the longitudinal axis 12a of the ferrule, and the end face separation is reliably controlled by a combination of fiber preparation and the fusion fixture.

Once the optical fiber stub 40 and the second optical fiber 42 are positioned, an arc can be established between the pair of electrodes 70 such that the optical fiber stub and the second optical fiber are fused into an integral optical fiber. In addition, during the fusion process, the surface tension of the molten glass fibers further aligns the resulting optical fiber.

As described above, the depth 28 of the fusion access slot 20 is preferably greater than a predetermined minimum depth and the width 26 of the fusion access slot is preferably greater than the predetermined minimum width such that the optical fiber stub 40 and the second optical fiber 42 can be efficiently fused. In particular, if the depth of the fusion access slot is too shallow or if the width of the fusion access slot is too narrow, a portion of the energy imparted by the electrodes will be expended in heating the ferrule instead of fusing the optical fiber stub and the second optical fiber, thereby decreasing the efficiency of the fusion process. In addition, if the depth of the fusion access slot is too shallow or the width of the fusion access slot is too narrow, the arc formed by the opposed electrodes 70 can deviate so as to further decrease the efficiency with which the optical fiber stub and the second optical fiber are fused.

After fusing the optical fiber stub 40 and the second optical fiber 42, various fiber protection methods can be employed to prevent contamination of the fused joint. For example, the fusion access slot 20 or the fusion access port 44 can be filled with a gel, such as a silicone adhesive, to protect the fused end portions of the optical fiber stub and the second optical fiber. In addition, the interior cavity of the crimp tube assembly 60 can be filled with a gel, such as a silicone adhesive, to further protect the second optical fiber. However, the optical fiber connector 10 need not include a fiber protecting gel since the optical fibers are generally adequately protected by the surrounding housing of the optical fiber connector as described below.

In addition, once the optical fiber stub 40 and the second optical fiber 42 have been fused, a portion of the crimp tube 62a, adjacent second end 66, can be radially compressed about the buffer of the second optical fiber such that rotational and axial forces to which the second optical fiber is subsequently subjected will not be translated to the fused joint. This crimping may be accomplished by means of a crimping means provided by the fusion fixture. Thereafter, the optical fiber connector 10 can be mounted within any one of the standard connector housings, such as an SC connector housing, an FC connector housing or an ST connector housing. In addition to providing a standard connector for coupling to coupling sleeves, patch panels or other terminals, the connector housing generally prevents bending forces from being applied to the ferrule 12 and, instead, typically limits the forces applied to the ferrule, if any, to tensile forces. Accordingly, the structural integrity and durability of the ferrule is further improved.

Figure 6:
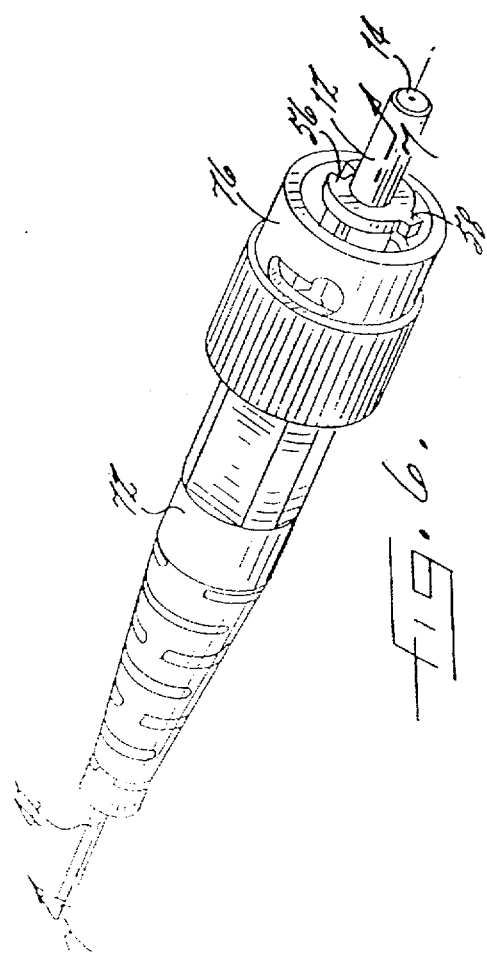
FIG. 6 is a perspective view of one embodiment of an optical fiber connector of the present invention following the assembly and fusion process.

For purposes of illustration, an ST connector housing is illustrated in FIGS. 1, 6 and 7. As best shown in FIG. 4, several components of the housing including the strain relief boot 72, the crimp body 74, the bayonet housing 76 and a spring 78 are preferably disposed upon the second optical fiber 42 prior to the insertion of the second optical fiber into the second end 16 of the ferrule 12. Once the optical fiber stub 40 and the second optical fiber have been fused, the spring, the bayonet housing, the crimp body and the strain relief boot can be slid along the second optical fiber and mounted to the ferrule and, more particularly, can be mounted to the crimp tube assembly 60.

In particular, the crimp body 74 generally has a tubular shape which defines a longitudinal bore through which the second optical fiber 42 extends. As shown in FIGS. 1 and 7, the tubular crimp body typically includes a first ring 80 extending radially inward into the longitudinal bore. In addition, the tubular crimp body preferably defines a lateral slot 82 which extends from a first end of the tubular crimp body longitudinally inward beyond the first ring to thereby divide a portion of the tubular crimp body into first and second crimp body segments 84. The first and second crimp body segments are adapted to resiliently deflect outwardly as tubular crimp body is mounted over or slid over the crimp tube assembly 60. In addition, the first ring of the tubular crimp body is adapted to securely mount behind or longitudinally inward of the crimp tube assembly relative to the second end 16 of the ferrule 12 such that the crimp tube assembly is securely mounted thereto.

As illustrated in FIGS. 1, 6 and 7, the bayonet housing 76 is also preferably disposed about at least a portion of the ferrule 12. In particular, the tubular crimp body 74 of this embodiment can also include means for engaging the bayonet housing, such as a second raised ring 86 extending radially outward from an outer surface of the tubular crimp body. Correspondingly, the bayonet housing includes a complimentarily shaped surface 88 extending radially inward into the bayonet housing for engaging the second raised ring once the tubular crimp body has been mounted about the crimp tube assembly 60.

As also shown in FIG. 7, the spring 78 is accordingly disposed between the alignment key 56 and the complimentarily shaped surface 88 of the bayonet housing 76 so as to maintain the bayonet housing in position. In addition, the crimp body 74 can include a third raised ring 81 extending radially outward as shown in FIGS. 1 and 7. The second raised ring serves as a step to further prevent the bayonet housing from being disassembled from the crimp body. In particular, the second raised ring is adapted to contact the inwardly extending complimentarily shaped surface 88 of the bayonet housing so as to prevent inadvertent disassembly of the bayonet housing. Furthermore, a dust cover 90 can also be mounted over the portion of first end 14 of the ferrule which extends beyond the bayonet housing to protect the optical fiber connector 10 from environmental contamination prior to connection as shown in FIG. 1.

The optical fiber connector 10 of the present invention can also be mounted to an end portion of a single fiber cable 94 as shown in cross-section in FIG. 9. As known to those skilled in the art, the single fiber cable includes a buffered optical fiber 42 and one or more lengthwise extending strength members 96, such as aramid yarn, surrounded by a protective jacket 98. According to the present invention, end portions of the jacket and aramid yarn are removed to expose the buffered optical fiber. Furthermore, the buffer coating is removed from an end portion of the exposed optical fiber.

The end portion of the exposed optical fiber 42 is extended through the bore of a tube 100, typically comprised of plastic or metallic material, and the tube is inserted within the single fiber cable between the strength member 96 and the buffered optical fiber. For example, the tube can be identical to the crimp tube 62 illustrated and described herein. Thereafter, the end portion of the exposed optical fiber is inserted into the second end 16 of the ferrule 12. In one embodiment, the end portion of the exposed field fiber is then fused to an optical fiber stub 40 and the components of a connector housing are assembled as described herein and as illustrated in FIG. 9.

As also illustrated in FIG. 9, the crimp body 74 can be radially compressed about a portion of the single fiber cable in which the tube 100 has been inserted. Thus, the jacket 98 and the strength member 96 of the single fiber cable can be securely held in a fixed position relative to the optical fiber connector 10 and between the crimp body and tube 100 while the optical fiber 42 is not damaged.

As described above, an optical fiber connector 10 of the present invention can be readily fabricated. In particular, the ferrule 12 can be formed and the optical fiber stub 40 disposed therein in a factory setting such that the first end of the optical fiber stub can be polished while disposed in the first end of the ferrule. Thereafter, an end portion of a second optical fiber 42, such as a field fiber, can be inserted through the second end 16 of the ferrule and fused to the optical fiber stub in the field. Once the field fiber and the optical fiber stub have been fused, the various components of the housing can be assembled to form the resulting optical fiber connector. Thereafter, the optical fiber connector can be mounted, such as via a coupling sleeve, to another optical fiber or to a patch panel, remote terminal, pedestal or other type of terminal as known to those skilled in the art.

Accordingly, the optical fiber connector 10 of the present invention includes a ferrule 12 having fusion access means, such as a fusion access slot 20 or a fusion access port 44, such that an optical fiber stub 40 and a second optical fiber 42 can be fused in the field. The ferrule and, more particularly, the fusion access means, is formed such that the ferrule is relatively strong and durable and will remain structurally intact during normal use. Thus, the optical fiber connector can be connected and disconnected numerous times without impairing the structural integrity of the connector. In addition, due to the design of the optical fiber connector, the connector can be readily installed by technicians in the field while maintaining excellent signal transmission properties due, at least in part, to the fusion of the optical fiber stub and the second optical fiber and to the polishing of the first end of the optical stub fiber.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. An optical fiber connector comprising:
a longitudinally extending ferrule having first and second opposed ends and a bore defined longitudinally therethrough, said ferrule also defining a fusion access slot which extends transversely across said ferrule from a first side of said ferrule to a bottom portion of the fusion access slot such that the bore opens into the fusion access slot, wherein the radial distance between the bottom portion of the fusion access slot and a second side of said ferrule, opposite the first side, is greater than a predetermined radial distance such that said ferrule remains structurally intact during use; and
an optical fiber stub disposed within the bore of said ferrule and extending from a first end adjacent the first end of said ferrule to a second end disposed within the fusion access slot defined by said ferrule;
wherein said ferrule is also adapted for receiving a second optical fiber which extends through the bore of said ferrule from the second end of said ferrule to the fusion access slot such that said ferrule maintains the second optical fiber and said optical fiber stub in general alignment so that the second optical fiber and said optical fiber stub can be fused within the fusion access slot.

2. An optical fiber connector according to claim 1 wherein the fusion access slot defined by said ferrule further includes first and second opposed sidewalls extending from a respective transversely extending edge of the bottom portion of the fusion access slot to the first side of said ferrule, and wherein each respective edge of the bottom portion of the fusion access slot is curved to further provide that said ferrule remains structurally intact during use.

3. An optical fiber connector according to claim 2 wherein each curved edge of the bottom portion of the fusion access slot has a predetermined radius of curvature, and wherein the predetermined radius of curvature of each curved edge is greater than a predetermined minimum radius of curvature to further increase the structural integrity of said ferrule.

4. An optical fiber connector according to claim 1 wherein the bore defined by said ferrule defines a longitudinal axis, and wherein the radial distance between the longitudinal axis of the bore and the bottom portion of the fusion access slot is greater than a predetermined minimum radial distance such that the second optical fiber and said optical fiber stub can be fused therein.

5. An optical fiber connector according to claim 1 wherein the fusion access slot has a predetermined width, and wherein the predetermined width of the fusion access slot is less than a predetermined maximum width to further provide that said ferrule remains structurally intact during use.

6. An optical fiber connector according to claim 5 wherein the predetermined width of the fusion access slot is greater than a predetermined minimum width such that the second optical fiber and said optical fiber stub can be fused therein.

7. An optical fiber connector according to claim 1 further comprising an annular alignment key mounted to said ferrule such that said ferrule extends therethrough, wherein said alignment key includes a position indicator, and wherein the fusion access slot defined by said ferrule is oriented in a predetermined angular relationship to the position indicator of said alignment key.

8. An optical fiber connector according to claim 1 further comprising a crimp tube assembly mounted to the second end of said ferrule, wherein said crimp tube assembly defines a lengthwise extending aperture therethrough, and wherein said crimp tube assembly is mounted to the second end of said ferrule such that the aperture defined therethrough is aligned with the bore defined by said ferrule such that the optical fiber connector is adapted to receive the second optical fiber through both the aperture defined by said crimp tube assembly and the bore defined by said ferrule.

9. An optical fiber connector according to claim 8 wherein said crimp tube assembly comprises:
   a crimp tube having opposed first and second ends, wherein the second end of said crimp tube is adapted to receive the second optical fiber; and
   an adapter housing defining an internal cavity having first and second cavity portions having first and second internal diameters, respectively, wherein the first internal diameter of the first cavity portion is sized to receive the second end of said ferrule, and wherein the second internal diameter of the second cavity portion is sized to receive the first end of said crimp tube.

10. An optical fiber connector according to claim 8 further comprising a lengthwise extending tubular crimp body mounted over said crimp tube assembly to the second end of said ferrule, wherein said tubular crimp body defines a longitudinal bore through which the second optical fiber can extend and includes a first ring extending radially inward into the longitudinal bore, wherein the first ring of said tubular crimp body is longitudinally inward of said crimp tube assembly and is sized smaller than said crimp tube assembly such that said tubular crimp body is securely mounted thereto.

11. An optical fiber connector according to claim 10 wherein said tubular crimp body further defines a lateral slot which extends from a first end of said tubular crimp body longitudinally inward beyond the first ring to thereby divide a portion of said tubular crimp body into first and second crimp body segments which are adapted to resiliently deflect outwardly such that said tubular crimp body can be mounted over said crimp tube assembly.

12. An optical fiber connector according to claim 1 wherein the optical fiber connector is adapted to be mounted to a single fiber cable comprising the second optical fiber, at least one strength member radially outward of the second optical fiber and a protective jacket, and wherein the optical fiber connector further comprises a crimp body defining a bore therethrough through which the single fiber cable extends, wherein said crimp body is adapted to be radially compressed about the end portion of the single fiber cable in which a tube has been inserted between the at least one strength member and the second optical fiber at the end portion of the single fiber cable, and wherein said crimp body is adapted to be mounted to the second end of said ferrule such that the single fiber cable is thereby secured to the optical fiber connector.

13. An optical fiber connector according to claim 1 wherein the second end of said optical fiber stub has a cleave angle of less than 1°.

14. An optical fiber connector comprising:
   a longitudinally extending ferrule having first and second opposed ends and a bore defined longitudinally therethrough, said ferrule also defining at least one cylindrical fusion access port extending transversely through said ferrule such that the fusion access port is in communication with the longitudinal bore to thereby define a splice cavity, wherein the fusion access port has a predetermined diameter, and wherein the predetermined diameter of the fusion access port is less than a predetermined maximum diameter such that said ferrule remains structurally intact during use; and
   an optical fiber stub disposed within the bore of said ferrule and extending from a first end adjacent the first end of said ferrule to a second end disposed within the splice cavity defined within said ferrule;
   wherein said ferrule is also adapted for receiving a second optical fiber which extends through the bore of said ferrule from the second end of said ferrule to the splice cavity such that said ferrule maintains the second optical fiber and said optical fiber stub in general alignment so that the second optical fiber and said optical fiber stub can be fused within the splice cavity.

15. An optical fiber connector according to claim 14 wherein the predetermined diameter of the fusion access port is greater than a predetermined minimum diameter such that the second optical fiber and said optical fiber stub can be fused therein.

16. An optical fiber connector according to claim 14 wherein said ferrule further defines at least one viewing port extending transversely through said ferrule, wherein the viewing port is in communication with the splice cavity such that the fusion of the second optical fiber with said optical fiber stub can be monitored.

17. An optical fiber connector according to claim 16 wherein the fusion access port and the viewing port define a fusion access port axis and a viewing port axis, respectively, and wherein the fusion access port axis and the viewing port axis define a predetermined angle therebetween.

18. An optical fiber connector according to claim 17 wherein the predetermined angle defined between the fusion access port axis and the viewing port axis is 90°.

19. An optical fiber connector according to claim 14 further comprising an annular alignment key mounted to said ferrule such that said ferrule extends therethrough, wherein said alignment key includes a position indicator, and wherein the fusion access port defined by said ferrule is oriented in a predetermined angular relationship to the position indicator of said alignment key.

20. An optical fiber connector according to claim 14 further comprising a crimp tube assembly mounted to the second end of said ferrule, wherein said crimp tube assembly defines a lengthwise extending aperture therethrough, and wherein said crimp tube assembly is mounted to the second end of said ferrule such that the aperture defined therethrough is aligned with the bore defined by said ferrule such that the optical fiber connector is adapted to receive the second optical fiber through both the aperture defined by said crimp tube assembly and the bore defined by said ferrule.

21. An optical fiber connector according to claim 20 wherein said crimp tube assembly comprises:
  a crimp tube having opposed first and second ends, wherein the second end of said crimp tube is adapted to receive the second optical fiber; and
  an adapter housing defining an internal cavity having first and second cavity portions having first and second internal diameters, respectively, wherein the first internal diameter of the first cavity portion is sized to receive the second end of said ferrule, and wherein the second internal diameter of the second cavity portion is sized to receive the first end of said crimp tube.

22. An optical fiber connector according to claim 14 wherein the optical fiber connector is adapted to be mounted to a single fiber cable comprising the second optical fiber, at least one strength member radially outward of the second optical fiber and a protective jacket, and wherein the optical fiber connector further comprises a crimp body defining a bore therethrough through which the single fiber cable extends, wherein said crimp body is adapted to be radially compressed about the end portion of the single fiber cable in which a tube has inserted between the at least one strength member and the second optical fiber at the end portion of the single fiber cable, and wherein said crimp body is adapted to be mounted to the second end of said ferrule such that the single fiber cable is thereby secured to the optical fiber connector.

23. An optical fiber connector according to claim 14 wherein the second end of said optical fiber stub has a cleave angle of less than 1°.

24. An optical fiber connector comprising:
  a longitudinally extending ferrule having first and second opposed ends and a bore defined longitudinally therethrough, wherein said ferrule is adapted to receive the end portion of an optical fiber of a single fiber cable such that the optical fiber extends through said ferrule, and wherein the single fiber cable comprises an optical fiber, at least one strength member radially outward of the optical fiber and a protective jacket;
  a crimp body defining a bore therethrough through which the single fiber cable is adapted to extend, wherein said crimp body is adapted to be radially compressed about the end portion of the single fiber cable in which a tube has been inserted between the at least one strength member and the optical fiber at the end portion of the single fiber cable, and wherein said crimp body is adapted to be mounted to the second end of said ferrule such that the single fiber cable is thereby secured to the optical fiber connector;
  a crimp tube assembly disposed within said crimp body and mounted to the second end of said ferrule, wherein said crimp tube assembly defines a lengthwise extending aperture therethrough, and wherein said crimp tube assembly is mounted to the second end of said ferrule such that the aperture defined therethrough is aligned with the bore defined by said ferrule such that the optical fiber connector is adapted to receive the end portion of the optical fiber of the single fiber cable through both the aperture defined by said crimp tube assembly and the bore defined by said ferrule;
  said crimp body including a lengthwise extending tubular housing adapted to mount over said crimp tube assembly to the second end of said ferrule, wherein said tubular crimp body also includes a first ring extending radially inward into the longitudinal bore, and wherein the first ring of said tubular crimp body is longitudinally inward of said crimp tube assembly and is sized smaller than said crimp tube assembly such that said tubular crimp body is securely mounted thereto.

25. An optical fiber connector according to claim 24 wherein said ferrule includes fusion access means into which the bore opens and into which the end portion of the optical fiber of the single fiber cable extends, and wherein the optical fiber connector further comprises an optical fiber stub disposed within the bore of said ferrule and extending from a first end adjacent the first end of said ferrule to a second end disposed within the fusion access means of said ferrule.

26. An optical fiber connector according to claim 25 wherein the fusion access means of said ferrule comprises a fusion access slot which extends transversely across said ferrule from a first side of said ferrule to a bottom portion of the fusion access slot such that the bore of said ferrule opens into the fusion access slot.

27. An optical fiber connector according to claim 25 wherein the fusion access mean of said ferrule comprises a fusion access port extending transversely through said ferrule such that the fusion access port is in communication with the bore of said ferrule to thereby define a spice cavity.

28. An optical fiber connector according to claim 24 wherein said crimp tube assembly comprises:
  a crimp tube having opposed first and second ends, wherein the second end of said crimp tube is adapted to receive the end portion of the optical fiber of the single fiber cable; and
  an adapter housing defining an internal cavity having first and second cavity portions having first and second internal diameters, respectively, wherein the first internal diameter of the first cavity portion is sized to receive the second end of said ferrule, and wherein the second internal diameter of the second cavity portion is sized to receive the first end of said crimp tube.

29. An optical fiber connector according to claim 24 wherein said tubular crimp body further defines a lateral slot which extends from a first end of said tubular crimp body longitudinally inward beyond the first ring to thereby divide a portion of said tubular crimp body into first and second crimp body segments which are adapted to resiliently deflect outwardly such that said tubular crimp body can be mounted over said crimp tube assembly.

30. A method of mounting an optical fiber connector to a single fiber cable having a protective jacket surrounding an optical fiber and at least one strength member, the method comprising the steps of:
  removing the protective jacket and the at least one strength member from the end portion of the single fiber cable to thereby expose the optical fiber;
  inserting a tube between the at least one strength member and the optical fiber;
  inserting the exposed end portion of the optical fiber into a bore defined longitudinally through a ferrule of the optical fiber connector;
  attaching a crimp body to the second end of the ferrule;

radially compressing the crimp body about the portion of the single fiber cable in which the tube is inserted such that the protective jacket and the at least one strength member are secured to the optical fiber connector;

mounting a crimp tube assembly to the second end of the ferrule such that the lengthwise extending aperture defined by the crimp tube assembly is aligned with the bore defined by the ferrule; and wherein the crimp body includes a tubular housing defining a longitudinally extending bore, and wherein the crimp body includes a first ring extending radially inward into the longitudinal bore, and wherein said step of attaching the crimp body to the second end of the ferrule includes the step of snapping the first ring over the crimp tube assembly to the second end of the ferrule such that the tubular crimp body is securely mounted thereto.

31. A method according to claim 30 wherein the ferrule of the optical fiber connector includes fusion access means, and wherein said step of inserting the exposed end portion of the optical fiber into the bore defined by the ferrule includes the step of inserting the exposed end portion of the optical fiber into the bore defined by the ferrule such that the end portion of the optical fiber extends from a second end of the ferrule to the fusion access means of the ferrule.

32. A method according to claim 31 further comprising the step of fusing the end portion of the optical fiber to an optical fiber stub within the fusion access means of the ferrule.

33. A method according to claim 30 wherein the optical fiber of the single fiber cable includes a buffer coating, and wherein the method further comprises the step of removing the buffer coating from a portion of the exposed end portion of the optical fiber prior to said step of inserting the optical fiber into the bore of the ferrule.

34. A method of fabricating an optical fiber connector comprising the steps of:

forming a longitudinally extending ferrule having first and second opposed ends and a bore defined longitudinally therethrough, wherein said forming step comprises the step of forming a fusion access slot which extends transversely across the ferrule from a first side of the ferrule to a bottom portion of the fusion access slot such that the bore opens into the fusion access slot, wherein said step of forming the fusion access slot comprises the step of maintaining the radial distance between the bottom portion of the fusion access slot and a second side of the ferrule, opposite the first side, greater than a predetermined radial distance such that the ferrule will remain structurally intact during use; and disposing an optical fiber stub within the bore of the ferrule such that the optical fiber stub extends from a first end adjacent the first end of the ferrule to a second end positioned within the fusion access slot formed in the ferrule such that the second end of the optical fiber stub is thereby adapted to be in general alignment with and to be fused to a second optical fiber which the ferrule is adapted to receive from the second end thereof.

35. A method according to claim 34 wherein the bore defined through the ferrule defines a longitudinal axis, and wherein said step of forming the fusion access slot further comprises the step of maintaining the radial distance between the longitudinal axis of the bore and the bottom portion of the fusion access slot greater than a predetermined minimum radial distance such that the second optical fiber and said optical fiber stub can be fused therein.

36. A method according to claim 34 wherein the fusion access slot includes first and second opposed sidewalls extending from a respective transversely extending edge of the bottom portion of the fusion access slot to the first side of said ferrule, and wherein said step of forming the fusion access slot further comprises the step of curving each respective edge of the bottom portion of the fusion access slot to further provide that the ferrule remains structurally intact during use.

37. A method according to claim 36 wherein the fusion access slot has a predetermined width, and wherein said step of forming the fusion access slot further comprises the step of maintaining the predetermined width of the fusion access slot less than a predetermined maximum width to further provide that said ferrule remains structurally intact during use.

38. A method according to claim 37 wherein said step of forming the fusion access slot further comprises the step of maintaining the predetermined width of the fusion access slot greater than a predetermined minimum width such that the second optical fiber and said optical fiber stub can be fused therein.

39. A method according to claim 34 wherein said disposing step comprises the step of securing the optical fiber stub within the bore of the ferrule with an epoxy.

40. A method according to claim 34 further comprising the step of polishing the first end of the optical fiber stub following said disposing step.

41. A method according to claim 34 further comprising the step of mounting an annular alignment key on the ferrule, prior to said forming step, such that the ferrule extends therethrough, wherein said alignment key includes a position indicator, and wherein said step of forming the fusion access slot comprises the step of forming the fusion access slot in a predetermined angular relationship to the position indicator of said alignment key.

42. A method according to claim 34 further comprising the step of mounting a crimp tube assembly to the second end of the ferrule, wherein said crimp tube assembly defines a lengthwise extending aperture therethrough, and wherein said mounting step comprises the step of mounting the crimp tube assembly to the second end of the ferrule such that the aperture defined therethrough is aligned with the bore defined by the ferrule such that the optical fiber connector is adapted to receive the second optical fiber through both the aperture defined by the crimp tube assembly and the bore defined by the ferrule.

* * * * *